United States Patent Office 3,352,645
Patented Nov. 14, 1967

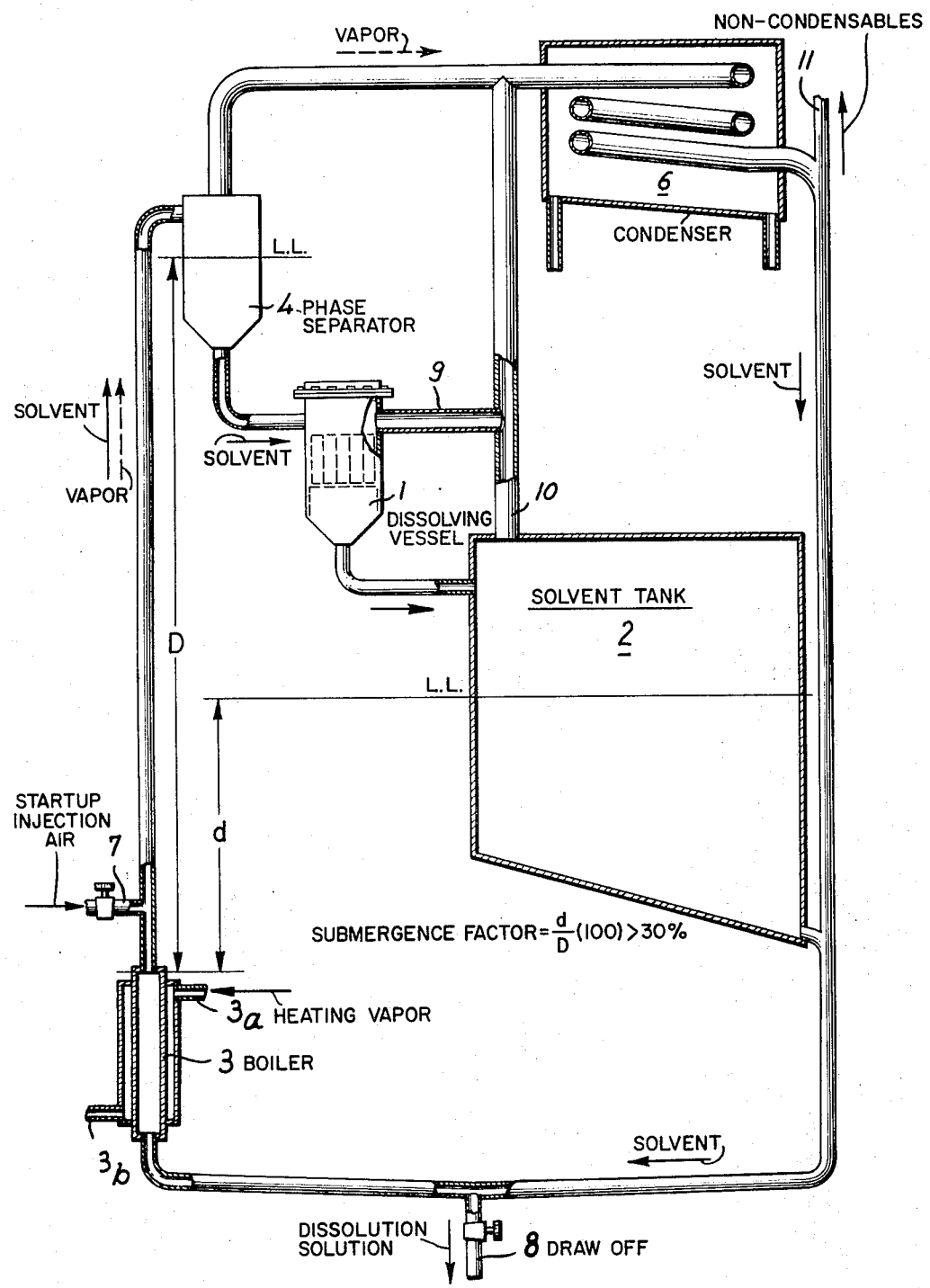

3,352,645
APPARATUS FOR DISSOLVING NUCLEAR MATERIALS
Pierre Faugeras, Montrouge, Pierre Michel, Courbevoie, and Xavier Talmont, Antony, France, assignors to Commissariat a l'Energie Atomique, Paris, France
Filed July 6, 1964, Ser. No. 380,489
Claims priority, application France, July 22, 1963, 942,246
5 Claims. (Cl. 23—272.6)

The present invention relates to a dissolving apparatus and more especially a subcritical dissolving apparatus which is particularly well suited to the dissolving of nuclear materials which are rich in fissile materials.

The recovery of nuclear materials (whether such materials are irradiated or not) is usually carried out by the "wet processing" method. The fuel is dissolved in a solvent such as nitric acid or hydrochloric acid. This operation entails the use of a dissolving apparatus which provides nuclear safety in the case of materials which are rich in fissile materials, is difficult to carry into practice, and a satisfactory answer to the problem of its application on an industrial scale had not been found up to the present time in all cases.

The appliances for dissolving nuclear materials which are at present in existence are usually adapted to a single type of fuel and have only a limited capacity. In order to modify the capacity of the apparatus, it is necessary either to vary the number of tanks which are associated with the dissolver or to increase the number of connecting tubes between the dissolver and the tank or tanks, thereby reducing nuclear safety.

The present invention is directed to a nuclear safe dissolving apparatus which permits the provision of a variable capacity. By virtue of a novel system of circulation of the attacking solution, the said apparatus has the advantage of being able to operate with a very variable tank-filling capacity and of being ready for service irrespective of the volume of liquid reagent which is necessary for the dissolving process.

Tht apparatus in accordance with the invention is essentially characterized in that it consists of the following elements: a nuclear safe dissolver in which the fuel to be dissolved is placed and which is associated with a nuclear safe tank for containing the solvent and having a capacity which can vary according to the dissolving conditions, said tank being placed at a level which is lower than that of the dissolver, a boiler which supplies an emulsion of said solvent and puts said solvent into circulation, said boiler being placed at a level which is lower than that of the tank and being displaced with respect to said tank, a phase separator placed at the top of the device, a vapor condenser and conduits for connecting the different elements of the apparatus.

The different elements which constitute the apparatus are disposed in such a manner that, in the design of interactions of the elements and tubes wherein said tubes provide a communication between said elements, each solid angle is smaller than one steradian, in which case the arrangement provides nuclear safety.

These constructional features endow the apparatus with the following properties:
(1) Nuclear safety on account of the dimensions of each element and the spatial arrangement of these elements relatively to each other;
(2) Dimensions of the dissolver which are adapted to those of the materials to be dissolved without entailing any need to take into consideration its liquid capacity, this latter being provided by the tank;
(3) The supply tank being placed at a level which is lower than that of the dissolver, the possibility of utilizing volumes of reagent which can be varied over a very wide range according to requirements without entailing any modification either of the apparatus or of the mode of operation.

The single accompanying figure represents a diagrammatic vertical cross-section of the apparatus in accordance with the invention.

The dissolver as designated by the reference 1 usually terminates in a frusto-conical base and is fitted with a detachable cover for the introduction of nuclear materials to be dissolved as well as with a support for said materials.

The volume of the dissolver is designed in such manner as to ensure nuclear safety. Reference can be made in this connection to the tables (LAMS 2415, TID 7016 (1961) U.S.A.E.C.). The dimensions of the dissolver are adapted to those of the materials to be dissolved.

The tank is designated by the reference 2, is preferably flat and has a trapezoidal shape. The boiler 3 can be constructed from a cylinder, is heated by means of a double jacket through which the vapor is admitted at 3a and is discharged at 3b. The separator 4 is constructed from a cylinder, its dimensions are adapted to the maximum flow rates established as a function of the maximum heating power and maximum submergence ratio. This ratio will be defined later.

The condenser 6 must have an exchange surface of sufficiently large area to condense the vapor which is generated.

The dissolution solution is then drawn off at 8.

The dissolver and the tank are fitted with two tubes 9 and 10 which can serve to eliminate nitrous vapors. Cooling action is usually sufficiently effective to ensure that the major part of the nitrous vapors are reoxidized and absorbed in the condenser. The oxides of nitrogen which are not absorbed in the condenser are sent through 11 into a sodium hydroxide absorption column.

The dissolving apparatus in accordance with the invention operates as follows:

The boiler 3 causes the solution to circulate from the tank to the dissolver, heats the solution and generates steam from the water of the solution. The steam which is thus produced as well as nitrous gases in the case in which the solvent is nitric acid form together with the solution a mixture having a lower specific gravity than that of the solvent and entrain the solvent with them in the liquid phase. The steam, which is not recondensed during the upward flow, is separated from the solution within the separator 4, sent to a condenser 6 then returned to the boiler 3. This circulation system can make is possible to attain hourly flow rates of at least ten times the total volume of the solution. The circulation of the solution from the dissolver to the tank is carried out simply under the action of gravity. The solution falls into the dissolver 1, runs over the fuel to be dissolved, attacks the fuel and drops into the tank 2. The cycle is then completed.

In order to avoid over-concentrations and precipitations and to maintain a high dissolving rate within the dissolver 1, the velocity of circulation of the solution within the apparatus is fairly high. This velocity of circulation is governed by the heating power of the boiler and by a factor which is known as the "submergence factor," this latter being the percentage ratio of the distance between the top of the boiler 3 and the level of the solution within the tank 2 to the distance between the top of the boiler 3 and the level of the solution within the separator 4, the apparatus being so designed as to operate satisfactorily above a 30% submergence factor.

The apparatus in accordance with the invention is additionally fitted with a device which, in order to start up the dissolving process in a more rapid and uniform manner, serves to inject air, for example, immediately at the outlet of the boiler at 7, this injection being stopped as soon as the circulation has achieved a steady state.

The characteristics of a subcritical dissolving apparatus in accordance with the invention will now be given by way of non-limitative example.

The geometry of the elements and their spatial arrangement are dependent on the conditions imposed by nuclear safety.

It is assumed that the materials which constitute the charge of the apparatus contain as a maximum the equivalent in fissile (fissionable) material of 1.5 kg. of $Pu^{239}$.

Each element is constructed according to the geometrical standards of the nuclear safety guide (LAMS 2415, TID 7016). Their spatial arrangement is designed in such manner that the sum of the solid angles in which it is possible to see from one element all the other elements and the tubes containing fissible materials is smaller than 1 steradian.

The apparatus consisted of:

A dissolver having a capacity of 4.5 liters and made up of a cylinder which was adapted to the shape of the pieces to be dissolved, and terminating in a frusto-conical base fitted with a detachable cover through which the fuel to be processed is introduced.

Cylindrical portion: height, 125 mm.; diameter, 180 mm.

Frusto-conical portion: large diameter, 180 mm.; small diameter, 25 mm.; height, 100 mm.

A flat tank of trapezoidal shape containing solutions having a concentration of fissile materials which did not exceed 200 grams per liter, said tank having a maximum capacity of 100 liters. The dimensions were as follows:

| | |
|---|---|
| Width | mm 1700 |
| Length of longest side | mm 2300 |
| Length of shortest side | mm 1700 |
| Thickness | mm 30 |

Uniformity of delivery was achieved as a result of the arrangement of the inlet and outlet tubes. Its trapezoidal shape prevented the accumulation of small particles.

A boiler constituted by a cylinder having an internal diameter of 100 mm. and a length of 1,000 mm., the heating surface area of which was approximately 0.3 $m.^2$. Steam heating made it possible to develop up to 15 kw.

A separator of the "cyclone" type having a diameter of 120 mm. and capable of separating approximately 1500 l/h of solution from 10 $m.^3$/h of vapor.

A vapor condenser: Exchange surface area, 0.8 $m.^2$; condensation capacity of 25 kg. of vapor per hour.

An apparatus for the recombination of nitrous vapors.

With a heating power of 10 kw. and "submergence factor" which was higher than 30%, an hourly flow rate of 5 to 40 times the total volume of the solution was obtained.

Each element of the apparatus provided nuclear safety and the combined assembly was not subject to any danger of neutronic interactions on account of the fact that the axes of all the elements and connecting tubes through which the solution was circulated were in a plane which was the plane of symmetry of the flat tank.

What we claim is:

1. Nuclear safe dissolving apparatus, characterized in that it comprises a nuclear-safe dissolving vessel of limited subcritical volume in which the fuel to be dissolved is placed and which is connected to a nuclear-safe flat tank having a subcritical maximum capacity dependent on the criticality of the liquid being processed and a plane of symmetry parallel to and midway between its most extensive flat sides for containing the solvent and having a solvent content which can vary according to the dissolving conditions, said tank being placed at a level which is lower than that of the dissolving vessel, a boiler of limited subcritical volume connected to said tank which supplies a vapor-liquid mixed phase of said solvent and puts said solvent into circulation, said boiler being placed at a level which is lower than that of said tank and being displaced with respect to said tank, a phase separator connected to said boiler and to said dissolving vessel placed at the top of the apparatus and a vapor condenser connected to said phase separator and to said boiler, the axes of symmetry of said dissolving vessel, said boiler, said phase separator and said vapor condenser lying in the plane of symmetry of said solvent containing tank.

2. Dissolving apparatus in accordance with claim 1, characterized in that said tank is a right trapezoidal prism with an inclined side as bottom.

3. Nuclear safe dissolving apparatus in accordance with claim 1 said boiler having a double jacket through which a heating vapor is intended to pass.

4. Nuclear safe dissolving apparatus in accordance with claim 1, the circulation of the solvent between the dissolving vessel and the solvent containing tank is obtained by means of the thermosiphonic action of vapor which being generated in said boiler in the circulating liquid.

5. Dissolving apparatus in accordance with claim 1, the heating power of said boiler and the ratio of the distance between the top of the boiler and the level of solution within the solvent containing tank to the distance between the top of the boiler and the level of solution within the separator having a submergence greater than 30%.

References Cited
UNITED STATES PATENTS

| | | | |
|---|---|---|---|
| 928,966 | 7/1909 | Hardesty | 23—272 |
| 1,942,848 | 1/1934 | Taylor et al. | 23—272.6 X |
| 3,181,593 | 5/1965 | Lindley | 159—1 |

FOREIGN PATENTS

| | | |
|---|---|---|
| 1,057,572 | 5/1959 | Germany. |
| 8,299 | 7/1896 | Sweden. |

NORMAN YUDKOFF, *Primary Examiner.*

J. SOFER, *Assistant Examiner.*